(12) United States Patent
Döttling et al.

(10) Patent No.: US 7,808,955 B2
(45) Date of Patent: Oct. 5, 2010

(54) METHOD FOR TRANSMITTING CONTROL DATA BETWEEN A BASE STATION AND A MOBILE STATION

(75) Inventors: Martin Döttling, Neubiberg (DE); Bernhard Raaf, Neuried (DE)

(73) Assignee: Cinterion Wireless Modules GmbH, Munich (DE)

( * ) Notice: Subject to any disclaimer, the term of this patent is extended or adjusted under 35 U.S.C. 154(b) by 835 days.

(21) Appl. No.: 10/573,731

(22) PCT Filed: Jul. 27, 2004

(86) PCT No.: PCT/EP2004/051613

§ 371 (c)(1),
(2), (4) Date: Mar. 27, 2006

(87) PCT Pub. No.: WO2005/032192

PCT Pub. Date: Apr. 7, 2005

(65) Prior Publication Data

US 2006/0227789 A1    Oct. 12, 2006

(30) Foreign Application Priority Data

Sep. 26, 2003    (DE)    ................... 103 44 765

(51) Int. Cl.
*H04W 4/00* (2009.01)
*H04J 3/00* (2006.01)
*H04B 7/212* (2006.01)
*H04M 1/00* (2006.01)

(52) U.S. Cl. .................. 370/336; 370/328; 370/332; 370/337; 370/347; 455/434; 455/550.1; 455/561

(58) Field of Classification Search .................. 370/271, 370/310, 314, 321, 328–332, 336–338, 341, 370/345, 347, 349, 442, 473, 535, 538, 540, 370/901–902, 912, 915–916, 395.21, 395.3–395.4, 370/395.64, 313, 343, 395.31, 395.42, 373, 370/377, 437, 458, 464, 468, 498, 529; 455/422.1, 455/434, 450–451, 466, 509, 550.1, 556.2, 455/561, 88, 418, 423–425, 436–439, 442–444, 455/448, 452.1–452.2, 512; 714/18, 20, 714/748–751, 746; 375/240.27
See application file for complete search history.

(56) References Cited

U.S. PATENT DOCUMENTS 6,519,731 B1 *    2/2003    Huang et al. ................. 714/751

(Continued)

FOREIGN PATENT DOCUMENTS

EP    1 313 245    5/2003

(Continued)

OTHER PUBLICATIONS

DAS Arnab, et al. Design and Performance of Down Link Shared Control Channel for HSDPA, in IEEE PIMRC 2002, pp. 1088-1091 FIG. 1, 3, 4, Chapter 1.

(Continued)

*Primary Examiner*—Meless N Zewdu
(74) *Attorney, Agent, or Firm*—Baker Botts L.L.P.

(57) ABSTRACT

Apparatuses and methods for transmitting control data on a physical channel between a mobile radio device and a base station in a cellular network. In particular, in a mobile radio network according to the UMTS standard (UMTS=Universal Mobile Telecommunication System) a packet-oriented data transmission between the mobile radio device and the base station is controlled using control data, wherein the control data includes a packet number for identifying a data packet.

16 Claims, 7 Drawing Sheets

| | Packet number that can be signaled $p_i$ | Current packet number $a_i$ | No. of transmissions $n_{k,i}$ | | | | No. of transmissions since last use $N_i$ |
|---|---|---|---|---|---|---|---|
| | | | Packet no. 0 | Packet no. 1 | Packet no. 2 | Packet no. 3 | |
| HARQ channel 1 | 4 | 1 | 1 | 2 | 1 | 1 | 3 |
| HARQ channel 2 | 3 | 0 | 2 | 3 | 1 | - | 4 |
| HARQ channel 3 | 3 | 2 | 1 | 4 | 4 | - | 5 |
| HARQ channel 4 | 2 | 1 | 3 | 2 | - | - | 3 |
| HARQ channel 5 | 2 | 0 | 1 | 1 | - | - | 1 |
| HARQ channel 6 | 2 | 1 | 3 | 5 | - | - | 3 |

U.S. PATENT DOCUMENTS

| | | | |
|---|---|---|---|
| 6,731,618 B1 * | 5/2004 | Chung et al. | 370/328 |
| 7,269,527 B1 * | 9/2007 | Frank | 702/108 |
| 7,366,119 B2 * | 4/2008 | Ahn | 370/310 |
| 2003/0165161 A1 * | 9/2003 | Kalliokulju et al. | 370/466 |
| 2003/0174662 A1 | 9/2003 | Malkamaki | |
| 2004/0088643 A1 * | 5/2004 | Kobayashi | 714/776 |

FOREIGN PATENT DOCUMENTS

| | | | |
|---|---|---|---|
| EP | 1 328 096 A2 * | 7/2003 | |
| GB | 2 350 984 A * | 12/2000 | |
| GB | 2 388 751 | 11/2003 | |

OTHER PUBLICATIONS

XP002301166—Ghosh A., et al., Control channel design for high speed downlink shared channel for 3GPP W-CDMA Rel 5, VTC 2003 Spring the 57$^{th}$ IEEE Semiannual Vehicular Technology Conference Proceedings JEJU Korea Apr. 22, 25, 2003 IEEE Vehicular Technology Conference, New York, NY IEEE US vol. 3 of 4 Conf. 57 Apr. 22, 2003 pp. 2085-2089.

XP002299253—TR 25 858 v. 1.1.0 R1-02-0435 3GPP TSG RAN WAG1 Meetings #23, Feb. 18, 2002, pp. 1-28 , pp. 13-14, Figure 10.

3GGG TSG RAN WG 1 Tdoc R1-030476, Motorola, "Overview of the Enhanced Uplink Proposal", Paris, France, May 2003.

3GPP TSG WAN 1 Tdoc R1-030144, Motorola, "Text proposal for the TR—Section 7.2" San Diego, USA Jan. 2003.

3GPP TSG RAN 1 Tdoc R1-030405, Nokia, "Physical/MAC layer ARQ with and without soft combining" Paris, France, May 2003.

3GPP TR 25.896 VO.3.2 Technical Report: Feasibility Study for Enhanced Uplink for UTRA FDD (Release 6); 49 pages, Jun. 2003.

* cited by examiner

FIG 3  Prior art

| $M_s$ \ b | 1 | 2 | 3 | 4 | 5 | 6 | 7 |
|---|---|---|---|---|---|---|---|
| 1 | 2 | 4 | 8 | 16 | 32 | 64 | 128 |
| 2 | 2 | 2 | 4 | 8 | 16 | 32 | 64 |
| 3 |  |  | 1 | 2 | 4 | 8 | 16 | 32 |
| 4 |  |  | 1 | 2 | 4 | 8 | 16 | 32 |
| 5 |  |  |  | 1 | 2 | 4 | 8 | 16 |
| 6 |  |  |  | 1 | 2 | 4 | 8 | 16 |
| 7 |  |  |  | 1 | 2 | 4 | 8 | 16 |
| 8 |  |  |  | 1 | 2 | 4 | 8 | 16 |
| 9 |  |  |  |  | 1 | 2 | 4 | 8 |
| 10 |  |  |  |  | 1 | 2 | 4 | 8 |

(N is the row index)

FIG 4

| $M_j$ \ b | 1 | 2 | 3 | 4 | 5 | 6 | 7 |
|---|---|---|---|---|---|---|---|
| 1 | 2 | 4 | 8 | 16 | 32 | 64 | 128 |
| 2 | 1 | 2 | 4 | 8 | 16 | 32 | 64 |
| 3 |  | 1.33 | 2.67 | 5.33 | 10.67 | 21.33 | 42.67 |
| 4 |  | 1 | 2 | 4 | 8 | 16 | 32 |
| 5 |  |  | 1.6 | 3.2 | 6.4 | 12.8 | 25.6 |
| 6 |  |  | 1.33 | 2.67 | 5.33 | 10.67 | 21.33 |
| 7 |  |  | 1.14 | 2.29 | 4.57 | 9.14 | 18.29 |
| 8 |  |  | 1 | 2 | 4 | 8 | 16 |
| 9 |  |  |  | 1.78 | 3.56 | 7.11 | 14.22 |
| 10 |  |  |  | 1.6 | 3.2 | 6.4 | 12.8 |

(N is the row index)

FIG 5

| N | 1 | 2 | 3 | 4 | 5 | 6 | 7 | 8 | 9 | 10 |
|---|---|---|---|---|---|---|---|---|---|---|
| Gain in % | 0 | 0 | 33.3 | 0 | 60 | 33.3 | 14.3 | 0 | 77.8 | 60 |

FIG 6

| Type | b | Mean number of signaling options | HARQ channels | Distribution function | Examples |
|---|---|---|---|---|---|
| A1 | 4 | 2.67 | 6 | identical | {2,2,2,2,2,2} |
| A2 |   | 2.67 | 6 | homogenous | {3,3,3,3,2,2} |
| A3 |   | 2.67 | 6 | inhomogenous | {4,3,3,2,2,2}, {4,4,2,2,2,2}, {5,3,2,2,2,2}, {6,2,2,2,2,2} |
| B1 | 5 | 5.33 | 6 | identical | {5,5,5,5,5,5}, {4,4,4,4,4,4}, {3,3,3,3,3,3}, {2,2,2,2,2,2} |
| B2 |   | 5.33 | 6 | homogenous | {6,6,5,5,5,5} |
| B3 |   | 5.33 | 6 | inhomogenous | {8,8,8,3,3,2}, {8,8,8,4,2,2}, {7,7,7,7,2,2}, {6,6,6,6,4,4}, {10,10,6,2,2} |
| C1 | 6 | 10.67 | 6 | identical | {$p_k, p_k, p_k, p_k, p_k, p_k$} with $p_k=\{2,3,...,10\}$ |
| C2 |   | 10.67 | 6 | homogenous | {11,11,11,11,10,10} |
| C3 |   | 10.67 | 6 | inhomogenous | {12,12,10,10,10,10}, {12,12,12,12,8,8}, {12,12,12,12,8,8} |
| D1 | 4 | 3.2 | 5 | identical | {3,3,3,3,3}, {2,2,2,2,2} |
| D2 |   | 3.2 | 5 | homogenous | {4,3,3,3,3} |
| D3 |   | 3.2 | 5 | inhomogenous | {4,4,4,2,2}, {5,4,3,2,2}, {5,5,2,2,2}, {6,4,2,2,2}, {6,3,3,2,2} |
| E1 | 5 | 6.4 | 5 | identical | {$p_k, p_k, p_k, p_k, p_k$} with $p_k=\{2,3,...,6\}$ |
| E2 |   | 6.4 | 5 | homogenous | {7,7,6,6,6} |
| E3 |   | 6.4 | 5 | inhomogenous | {8,8,8,4,4}, {9,9,8,4,2}, {8,8,8,6,2}, {8,8,6,5,5}, {10,10,6,4,2} |
| F1 | 3 | 2.67 | 3 | identical | {2,2,2} |
| F2 |   | 2.67 | 3 | homogenous | {3,3,2} |
| F3 |   | 2.67 | 3 | inhomogenous | {4,2,2} |
| G1 | 4 | 5.33 | 3 | identical | {$p_k, p_k, p_k$} with $p_k=\{2,3,4,5\}$ |
| G2 |   | 5.33 | 3 | homogenous | {6,5,5} |
| G3 |   | 5.33 | 3 | inhomogenous | {6,6,4}, {7,6,3}, {7,7,2}, {7,5,4} |
| H1 | 5 | 10.67 | 3 | identical | {$p_k, p_k, p_k$} with $p_k=\{2,...,10\}$ |
| H2 |   | 10.67 | 3 | homogenous | {11,11,10} |
| H3 |   | 10.67 | 3 | inhomogenous | {12,12,8}, {14,10,8}, {14,14,4}, {13,13,6} |
| I1 | 3 | 1.33 | 6 | identical | {1,1,1,1,1,1} |
| I2 |   | 1.33 | 6 | homogenous | {2,2,1,1,1,1} |
| I3 |   | 1.33 | 6 | inhomogenous | {3,1,1,1,1,1} |

FIG 7  Prior art

| b=6 | Packet number | HARQ channels | Redundancy version |
|---|---|---|---|
| non-SHO | 1 | 3 | 2 |
| SHO | 3 | 3 | 0 |

FIG 8  Prior art

| b=6 | Packet number | HARQ channels | Redundancy version |
|---|---|---|---|
| non-SHO | 2 | 8 | 4 |
| SHO | 8 | 8 | 1 |

FIG 9

| b=6 | Packet number | HARQ channels | Redundancy version |
|---|---|---|---|
| non-SHO | 2 | 6 | 5.33 (type B) |
| SHO | 10.67 (type C) | 6 | 1 |
| SHO | 5.33 (type B) | 6 | 2 |
| SHO | 8 | 6 | 1.33 (type I) |

FIG 10

| b=5 | Packet number | HARQ channels | Redundancy version |
|---|---|---|---|
| non-SHO | 2 | 6 | 2.67 (type A) |
| SHO | 5.33 (type B) | 6 | 1 |

FIG 11

| b=4 | Packet number | HARQ channels | Redundancy version |
|---|---|---|---|
| non-SHO | 2 | 6 | 1.33 (type I) |
| SHO | 2.67 (type A) | 6 | 1 |

FIG 12

| | HARQ channel | | | | | |
|---|---|---|---|---|---|---|
| | 1 | 2 | 3 | 4 | 5 | 6 |
| Time 1 | 2 | 2 | 1 | 1 | 1 | 1 |
| Time 2 | 1 | 1 | 2 | 2 | 1 | 1 |
| Time 3 | 1 | 1 | 1 | 1 | 2 | 2 |
| Time 4 | 2 | 1 | 1 | 2 | 1 | 1 |
| Time 5 | 1 | 2 | 1 | 1 | 2 | 1 |
| Time 6 | 1 | 1 | 2 | 1 | 1 | 2 |

FIG 13

|        | Redundancy versions that can be signaled |
|--------|:---:|
| Time 1 | 1 |
| Time 2 | 2 |
| Time 3 | 1,2 |
| Time 4 | 1 |
| Time 5 | 2 |
| Time 6 | 1,2 |

FIG 14

|  | Packet number that can be signaled $p_i$ | Current packet number $a_i$ | No. of transmissions $n_{k,i}$ ||||  No. of transmissions since last use $N_i$ |
|---|:---:|:---:|:---:|:---:|:---:|:---:|:---:|
|  |  |  | Packet no. 0 | Packet no. 1 | Packet no. 2 | Packet no. 3 |  |
| HARQ channel 1 | 4 | 1 | 1 | 2 | 1 | 1 | 3 |
| HARQ channel 2 | 3 | 0 | 2 | 3 | 1 | - | 4 |
| HARQ channel 3 | 3 | 2 | 1 | 4 | 4 | - | 5 |
| HARQ channel 4 | 2 | 1 | 3 | 2 | - | - | 3 |
| HARQ channel 5 | 2 | 0 | 1 | 1 | - | - | 1 |
| HARQ channel 6 | 2 | 1 | 3 | 5 | - | - | 3 |

METHOD FOR TRANSMITTING CONTROL DATA BETWEEN A BASE STATION AND A MOBILE STATION

FIELD OF TECHNOLOGY

The present disclosure generally relates to transmitting control data on a physical channel between a mobile radio device and a base station in a cellular network

BACKGROUND

In cellular mobile radio systems a communication connection is established between a mobile radio device, generally also referred to as a terminal, a mobile terminal or user equipment (UE), and the mobile radio network via a so-called base station. The base station serves mobile radio users in a specific area a so-called cell via one or more radio channels. Such a base station also referred to as node B in the UMTS standard provides the actual radio interface between the mobile radio network and the mobile terminal. It deals with the radio operation with the different mobile users within their cell and monitors the physical radio connections. It also transmits network and status messages to the terminals. A distinction is made between two connection directions in mobile radio. The downlink DL describes the direction from the base station to the terminal, the uplink UL the direction from the terminal to the base station.

Generally a number of different transmission channels exist in each direction. There are therefore so-called dedicated channels, for example, for the specific transmission of information from or for a specific terminal. There are also so-called common channels, which serve to transmit information intended for a number or even all of the terminals from the base station. Similarly there are common channels in the backward direction, which the different terminals share, for example, for the transmission of short messages or control data to the base station, each terminal only using the channel for a short time. The different channels are thereby generally multi-layer in structure. The base is a so-called physical channel, referred to as layer 1 for example in the UMTS standard.

To transmit the different data elements, different logical channels are implemented on different higher layers on top of the physical channel, i.e., the lowest layer. Data is thereby generally transmitted on the physical channel in a packet-oriented manner, i.e., the data to be transmitted is divided into individual packets, which are sent temporally one after the other. Control data is also transmitted in packet form generally with a temporal offset parallel to the useful data to be transmitted. This is required on the recipient side in order to identify the packets and re-assemble them correctly. The control data can thereby include a packet number for example, which serves to identify a data packet.

A typical example of such a physical channel, on which such a transmission method is used, is the so-called HSDPA (High Speed Downlink Package Access) channel. This is a downlink channel according to the most recent UMTS standard. The transmission method used there is a fast, so-called HARQ Method (HARQ=Hybrid Automatic Repeat Request). An ARQ method (Automatic Repeat Request) is an error protection method, with which the blocks to be transmitted are continuously numbered and provided with a block check sequence, which the recipient uses to decide whether a transmission error has occurred. Correct blocks are acknowledged by the recipient using a so-called ACK signal. The recipient responds to an incorrect block either with a negative acknowledgement, a so-called NACK signal, or the block is ignored, whereupon the sender repeats the transmission after a pre-defined period of time. The sender only sends a new packet on the same channel, when the immediately preceding block has been positively acknowledged by the recipient (so-called stop and wait method).

The term hybrid means that parity bits (check bits) are also transmitted for error protection purposes. A multi-channel stop and wait protocol (so-called n-channel stop and wait) is used on the HSDPA channel. Temporal distribution is thereby used on the physical channel to implement a number of time channels, to which different transmission time intervals are assigned, each corresponding to a block length. This allows further blocks to be sent in the other time channels while waiting for the acknowledgement for a transmitted block in one time channel. The channel number of the respective time channel must be sent specifically as a control parameter to the recipient from the sender for example. Whether a transmitted block is a new packet or a re-transmission of the last packet can be seen from the packet number referred to above for identifying the data packet.

Only a limited number of packet numbers are thereby available for each time channel and these are always used in a cyclically alternating manner. In other words, after the last packet number has been used, the next new data packet is given the first number again, etc. In the case of the HSDPA channel, this packet number is referred to as the so-called new data indicator NDI. In the case of the HSDPA, only 1 bit is made available for this and it changes value with each new packet.

The different control parameters required for control purposes, e.g., the channel number and packet number, first have to be coded in the context of a source-coding before transmission. In the case of the HSDPA, the channel number is source-coded into 3 bits. The packet number is thereby source-coded separately into a 1-bit packet number. The information data thus generated is then channel-coded. In a so-called rate matching method, this data is then reduced such that it can be transmitted within a defined transmission time interval of a time channel, which is two milliseconds in the case of the HSDPA.

However the use of this HSDPA method for uplink signaling from the individual terminals to the base station is relatively unfavorable. A so-called SHO method (SHO=soft handover) method is frequently used on the uplink channels. With this method, a radio connection is simultaneously maintained between the terminal and the network in a parallel manner via a number of base stations, such that a terminal moving within the network can be handed over in a smooth manner between the individual base stations. In the SHO method, the power regulation of the terminal is controlled such that decoding can take place successfully on one of the connections at least. This means, however, that often only the base station with the best channel conditions can decode the associated control data. For other base stations using the SHO method, a number of packets with the associated control data may not be comprehensible. Also a soft-combining method is generally used to improve transmission quality with the current standards. Different transmissions of a packet are thereby superimposed before decoding, i.e., the first transmission is used first and if this cannot be decoded, the re-transmission is superimposed with the first transmission, thereby increasing the signal energy of the packet. With this per se advantageous combination of soft handover and soft combining the problem arises that a 1-bit packet number is not adequate to prevent incorrect superimposition of different packets.

This is illustrated using the following example: Where there are three successive packets, if only one 1-bit packet number is used, these are given the packet number 0,1,0. If one of the base stations using the SHO method does not receive the middle packet with the packet number 1, but another base station does, the receiving base station will acknowledge the packet. The terminal then sends the third packet again with the number 0. The base station which could not decode the middle packet then assumes that the third packet is a re-transmission of the first, since the packet number has not changed between two decoded packets. This base station will, therefore, try to decode the packet with the transmissions of both packets superimposed. As the packets do not, however, correspond, this decoding attempt will inevitably fail. Such frequently occurring events have a negative effect on system performance.

One possible way of avoiding this problem would be to use an n-bit packet number where n>1. In this instance, there is only a risk of confusing a new packet and a re-transmission of the last packet, if the recipient in question has in the meantime been unable to decode any of the transmissions of 2n−1 packets in sequence. One disadvantage of this method is that n-bit signaling outlay results, which is only required in instances where an SHO situation actually exists. This is the case during approximately 30% of the transmission time. In 70% of the transmission time n−1 bit is in principle unnecessary and simply increases the signaling outlay.

Signaling outlay can be saved if an HARQ method is used, in which a quite specific time slot is available in each HARQ channel from a fixed time. This has the advantage that the HARQ channel number does not have to be sent specifically and can be determined for example from the so-called system frame number SFN. However, it has the disadvantage of reduced flexibility with regard to resource allocation, with the result that the system as a whole cannot be used optimally and packet transmission is delayed further. As a result, the method as a whole is less efficient.

It would also be possible, when using the SHO method, not to implement soft-combining and not to superimpose re-transmissions. Since the packets are not superimposed, it is not necessary to transmit a packet number on the physical channel and the signaling for this is not required. One disadvantage of this is, however, that the gain due to the soft-combining method is lost and the data throughput as a whole is reduced.

SUMMARY

The present disclosure addresses the deficiencies noted above in the prior art methods.

An object of the present disclosure is, therefore, to create an improved method for transmitting control data, including a packet number with which the control data is transmitted with as much error protection as possible and at the same time the signaling outlay is reduced as far as possible. The packet number is source-coded at least together with a further control parameter for the transmission. In other words, in the source-coding process the packet number is not simply converted to a number of predefined information bit (i.e., with a further control parameter being converted parallel thereto to separate bits and these bits then being appended to each other) instead the control parameters to be transmitted are first combined in an appropriate manner and then converted together to the available bits in the source-coding process.

The source-coding of the packet number together with further control parameters, e.g., a channel number, transport format, redundancy version, etc., allows the available code word space to be utilized more effectively than if the different control parameters were source-coded separately and the signaling bits then appended. This is shown very clearly in the comparison below, in which it is assumed that a specific number of bits b is available to code a packet number and a further control parameter, here for instance a time channel number. The number Ms of packet numbers that can be signaled with a separate coding is $$M_s = 2^{b-\lceil log2 N_T \rceil} \tag{1}$$

NT here is the number of time channels used. The number Ms of packet numbers that can be signaled is thereby the same for all channels.

With common source-coding, however, the mean number Mj of packet numbers that can be signaled is $$M_j = \frac{2^b}{N_T} \tag{2}$$

The following is an example. It is assumed that six time channels would suffice to ensure that a sender can send at any time in a multi-channel stop and wait method. A separate coding for signaling the six channels 3 signaling bits would have to be available to code the channel number. In principle, however, it is possible to signal up to eight channels with 3 bits. The code word space provided by these 3 signaling bits is, therefore, not fully utilized. Similarly, correspondingly more bits would have to be available for signaling more than 2 packet numbers; for example, 2 bits for signaling 4 packet numbers. In other words, a total of 5 signaling bits has to be transmitted. With common source-coding, however, 6 different channels with 5 different packet numbers per channel could be signaled within these 5 signaling bits. In other words, there is an additional gain of one packet number, without more signaling bits having to be transmitted.

The method of the invention is particularly advantageous when the transmission method mentioned above is used. That is to say, with different time channels being available to send the data packets, the channels being implemented by temporal distribution of the same physical channel, and with a data packet being sent repeatedly by the transmitting device in each instance on one time channel until the transmitting device receives a confirmation signal from a receiving device. In other words, the invention is advantageous in particular with a multi-channel stop and wait ARQ transmission method, in which the packet numbers for packets to be transmitted for the first time are re-used cyclically. The invention is, however, not restricted to such transmission methods but can be used with all methods, in which packet numbers have to be transmitted with further control parameters for controlling the packet-oriented data transmission.

The control parameters, which are source-coded together with the packet number, can be a wide range of control parameters. In particular, the channel number of the time channel, in which the data packet in question is sent, can be source-coded together with the packet number. Such a channel number of the time channel is transmitted when an asynchronous method is used, with which unlike with the so-called partially synchronous method the time during which transmission takes place in a specific time channel is not specifically set.

When transmitting with different time channels on the same physical channel (wherein many different time channels are preferably used as a maximum) the sum of the transmission time intervals of the available time channels covers the round-trip time; at the end of which re-transmission can take place on a specific time channel after a previous transmission. Any larger number of time channels would not improve system performance. The claimed method restricts the number of time channels, which is expedient in so far as the unused code space can be utilized effectively as described above for coding additional packet numbers. If, for example, transmit time is not permanently available to a sender due to the available resources, it is optionally expedient to use even fewer time channels; such that the round-trip time is not completely covered by the sum of the transmission time intervals.

The soft-combining method mentioned above is advantageously used for transmission, with a number of re-transmissions of a data packet being superimposed by the recipient for decoding a data packet. The individual packet transmissions can thereby each have specific different and/or identical elements. If all transmissions have identical bits, soft-combining achieves an increase in energy to facilitate data packet decoding by the recipient. This method is also referred to as chase-combining.

It is another object of the invention to provide a transmission method with so-called incremental redundancy, also referred to hereafter as an IR method. The re-transmissions to some degree have different data, in particular different redundancy data. By using different redundancy data in the different transmissions of the same packet, it is possible to improve the code rate as well as achieving an energy increase. The code rate is defined by the ratio of the transmitted useful information bits to the number of information bits transmitted as a whole. When an IR method is used, the recipient must know in each instance which redundancy bits or which variant the respective transmission contains. To this end, the sender sends the recipient a redundancy version indicator or redundancy version for short as a further control parameter. With this method, therefore, the redundancy version indicator is also preferably source-coded together with the packet number and optionally also the channel number of the time channel and/or further control parameters.

Common source-coding means that it is also possible in particular to assign different numbers of packet numbers to the different time channels to utilize the code space fully. This is shown for example by equation (2), in which the mean number of packet numbers Mj that can be signaled does not necessarily have to result in a whole number. Full utilization of the code space can be achieved in such instances by assigning some of the channels a higher number of packet numbers that can be signaled than others. All distributions P={p1, p2, . . . , pN} of numbers of packet numbers pi that can be signaled of the individual time channels i=1 to N are possible, for which the following applies:

$$\sum_{i=1}^{N} P_i = W \leq 2^b \quad (3)$$

where pi≧2 and a whole number. W refers to the number of code words used from the maximum 2b options. The code space is utilized to the maximum for W=2b. In certain conditions, however, a coding can be expedient, with which the code space is not fully utilized, i.e., W<2b, as the unused code words can be used to improve the channel coding performance. As a result, it is possible to achieve a specific target error rate, for example, with low transmit power for the control channel.

In the above example of five available bits that can be signaled and six channel numbers to be signaled, equation (2) gives the mean number of packet numbers that can be signaled Mj=5.33. Optimum utilization of the code space is thereby achieved, in that, for example, six packet numbers that can be signaled are assigned to two of the time channels and only five packet numbers can be signaled on the further four time channels respectively. Similarly different numbers of redundancy version indicators can also advantageously be assigned to the different time channels.

These assignments can in principle be completely fixed, i.e. determined once before the method. Alternatively however it is also possible for the number of packet numbers and/or the number of redundancy versions of at least one of the time channels preferably even all the time channels to be variable, i.e. to be modified during a data transmission, for example according to a fixed time rule or by notification of the modified configuration between sender and recipient.

The number of redundancy version indicators of the time channel in question can thereby be modified according to a predefined sequence at specified time intervals. It is particularly preferred for the number of packet numbers and optionally also the number of redundancy version indicators of at least one of the time channels or optionally for all the time channels, to be selected as a function of the current transmission situation. This is particularly advantageous in certain situations where a larger number of packet numbers may be necessary, while in certain other situations a smaller number of packet numbers suffices. Thus, the number of packet numbers could be increased, for example, in an SHO situation, while only two packet numbers suffice in a non-SHO situation.

It is another object of the invention to make it possible to switch between the different soft-combining methods, with no redundancy version indicator at all having to be transmitted specifically when the so-called chase-combining method is used. In instances where incremented redundancy is implemented, however, the number of redundancy version indicators than can be signaled is increased accordingly. Transmission resources can be allocated to the senders taking into account the number of time channels used by the respective devices and/or numbers of packet numbers and/or numbers of redundancy version indicators of the different time channels of the transmitting device in question that can be signaled. In other words, when the data transmission method is used on an uplink, the so-called scheduler, (which can be implemented in the base station and which allocates transmit times to the different terminals) knows the distribution functions of the time channels, the numbers of packet numbers and the numbers of redundancy version indicators of the individual terminals, and takes these into account during resource allocation.

The time channels are also preferably prioritized according to their number of packet numbers when selecting a time channel for a pending transmission of a new data packet. In the simplest form, the time channels that have a higher number of packet numbers can simply be preferred, which can enhance the overall system performance. In order to be able to implement this in a simple manner, it is advantageous to distribute a number of packet numbers to the individual time channels such that the distribution of the number of packet numbers is a monotonously increasing or monotonously decreasing function in respect of the channel numbers of the available time channels. In other words, as the channel number increases, the respective time channel receives fewer or more packet numbers that can be signaled. The highest or lowest channel number of the free time channels in each instance can then advantageously be taken into account. This is a particularly simple selection algorithm that gives preference to time channels with higher numbers of packet numbers during selection. This algorithm can of course easily be extended to include the instance where the distribution of the number of packet numbers is not monotonous.

In an embodiment of the invention a time channel for a pending transmission can also be selected according to a specific selection rule, taking into account when different combinations of channel numbers and packet numbers were last used. This can be a rule that is permanently predefined for all senders. One possible rule is, for example, a simple counting or storing of transmission to date since the last use of the possible channel number/packet number combination in each instance. This selection rule can be configured such that the different channel number/packet number combinations are taken into account as well as the numbers of packet numbers on the individual time channels.

In yet another embodiment of the invention it is also possible for a time channel to be selected taking into account temporal information relating to transmission to date on the different time channels. This temporal information can for example include the time of the last transmission with a specific channel number/packet number combination or even the mean time period between two successive packet numbers for each time channel. In this way it is possible to maximize the time interval to the recurrence of a specific combination. It is also possible to select a time channel for a pending transmission of a new data packet taking into account use times of the different time channels to date. The mean use time is preferably taken into account here to minimize outlay for the method as far as possible.

The claimed method is particularly advantageous for improving uplink transmission, In other words, for the transmission of data from the mobile radio device to the base station. The mobile radio device must hereby as usual have means for transmitting control parameters on a physical channel to a base station in the cellular network, in order to control the packet-oriented data transmission from the mobile radio device to the base station. As usual, the mobile radio device also requires a source-coding device, which source-codes the control parameters before transmission the control parameters include a packet number to identify a data packet. According to the invention, this coding device must be configured such that the packet numbers are source-coded at least together with a further control parameter for the transmission.

The means for transmitting the control data can include at least one transmit/receive device with a suitable antenna mechanism and a processor device, which controls the different processes within the mobile radio device and generates or correspondingly selects the control data. The source-code device can thereby be implemented in the form of software within the processor device of the mobile radio device. The base station can also have a corresponding decoding device, which is configured such that the packet number is decoded together with the further control parameters.

It is, however, also possible to use the method for downlink data transmission. In this instance, the base station must correspondingly have means for transmitting the control parameters on the physical channel to the mobile radio device and a source-coding device, which is configured such that the packet number is source-coded at least together with a further control parameter for the transmission. In this instance, a claimed mobile radio device can have a corresponding decoding device, which is configured such that the packet number is decoded together with the further control parameters.

BRIEF DESCRIPTION OF THE FIGURES

The various objects, advantages and novel features of the present disclosure will be more readily apprehended from the following Detailed Description when read in conjunction with the enclosed drawings, in which:

FIG. 3 illustrates a table, showing the number Ms of packet numbers that can be signaled as a function of the number of signaling bits and the time channels to be signaled with separate coding according to the prior art.

FIG. 4 illustrates a table, showing the mean number of packet numbers that can be signaled $M_j$ as a function of the number of signaling bits and the time channels to be signaled, with common source-coding according to an embodiment of the invention.

FIG. 5 illustrates a table, showing the percentage signaling gain as a result of common source-coding.

FIG. 6 illustrates a table, showing examples of different distribution functions in respect of the numbers of packet numbers that can be signaled in the different time channels.

FIG. 7 illustrates the number of signaling bits available for the individual control parameters with a total number of six signaling bits and a separate source-coding according to the prior art.

FIG. 8 illustrates the number of options that can be signaled associated with the signaling distribution according to FIG. 7.

FIG. 9 illustrates a diagram of different options that can be signaled with common source-coding with a total of six signaling bits for comparison with FIG. 8.

FIG. 10 illustrates a table as in FIG. 9 but for a total of five signaling bits.

FIG. 11 illustrates a table as in FIG. 9 but for a total of four signaling bits.

FIG. 12 illustrates a possible distribution that varies over time of the redundancy versions that can be signaled on different HARQ channels.

FIG. 13 illustrates an exemplary embodiment of a variation over time of the number of redundancy version indicators that can be signaled for a specific time channel.

FIG. 14 illustrates a tabular summary of an exemplary embodiment for a method for selecting a specific time channel.

DETAILED DESCRIPTION

The invention is described below based on an example asynchronous, fast HARQ method using a multi-channel stop and wait protocol with soft-combining, as used to transmit data on the HSDPA channel according to the most recent UMTS standard. The present invention is particularly suited for such a method but is in no way limited to this method. It is also generally assumed—without restricting the invention—that the method for transmitting control parameters is used on an uplink channel from a mobile radio device to a base station. The term "mobile radio device" in the sense of this invention refers to all devices with a corresponding mobile function, e.g. a PDA with a mobile radio element.

Figure 1:
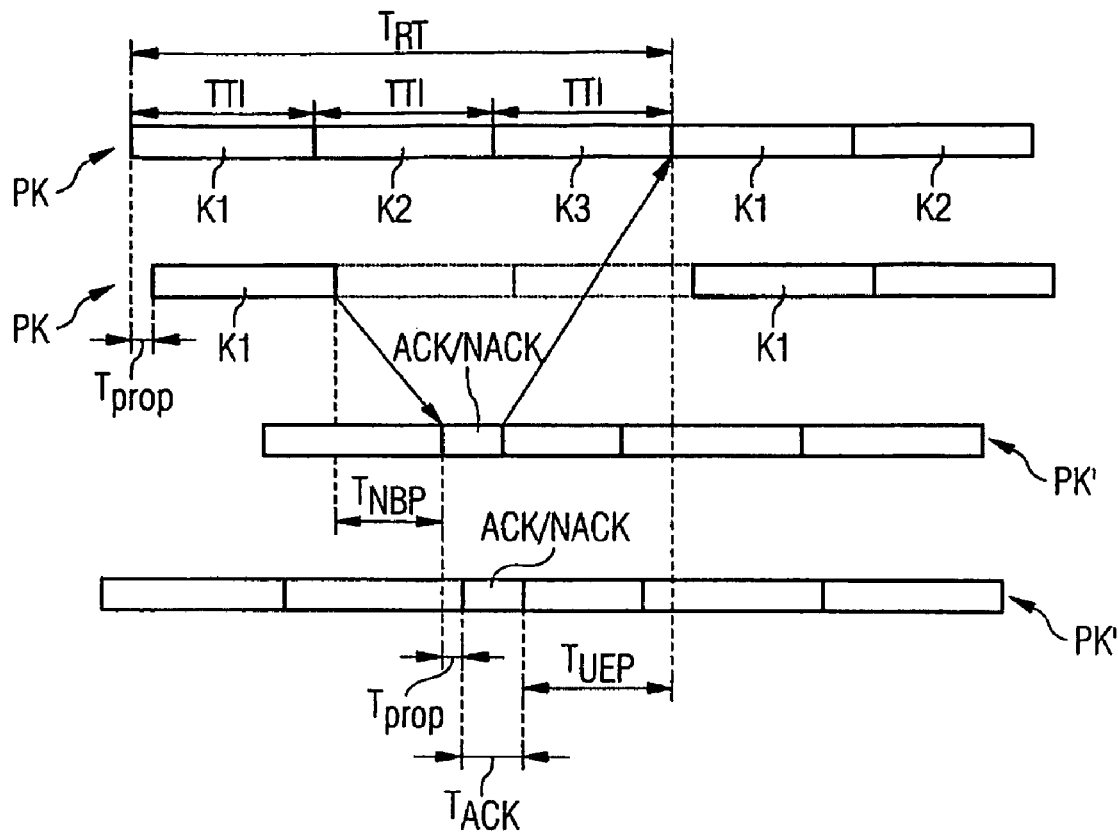
FIG. 1 illustrates a diagram of the principles of an n-channel stop and wait HARQ method with three different time channels implemented on one physical channels.

The principal mode of operation of such an HARQ method is shown in FIG. 1. The upper bar illustrates the temporal situation on the physical channel PK used to transmit the data at the sender. The bar below illustrates the situation with corresponding temporal displacement of the transmission time $T_{prop}$ on the physical channel PK at the recipient. The third bar shows the temporal situation on the physical channel PK' used to transmit the return message at the recipient and the lowest bar shows the situation with corresponding temporal displacement of the transmission time $T_{prop}$ on the physical channel PK' at the sender.

The data to be transmitted is transmitted in each instance in the form of packets on the physical channel PK. Each packet transmission thereby lasts for a precisely specified transmission time interval TTI. The transmission time interval TTI on the HSDPA channel is for example 2 ms.

After receiving a transmission, the recipient requires a processing time TNBP to decode the data and generate a return message (feedback information) for the sender. This feedback information contains a positive confirmation signal ACK (acknowledgement), if it was possible to decode the data correctly. Otherwise, a negative confirmation signal NACK (not acknowledgement) is feedback. This confirmation signal ACK, NACK has a length $T_{ACK}$ in each instance. On receipt of the feedback information, the sender can use the channel again after a further processing time $T_{UEP}$ corresponding to the feedback information. The time period until the earliest possible re-use of the channel in question is referred to as round-trip time $T_{RT}$.

In the event of a positive confirmation signal ACK a new packet can be sent on the channel. In the event of a negative confirmation signal NACK, the old one must be re-transmitted. To utilize the transmit time available on the physical channel PK more effectively, said physical channel PK is divided into a number of time channels K1, K2, K3 hereafter also referred to as HARQ channels without restricting the invention. In the time interval until the feedback information is sent back and evaluated, the same method can, therefore, be operated on the further HARQ channels K1, K2, K3 in time multiplex. Generally, at least so many HARQ channels K1, K2, K3 are used until it is possible to send data at any time. In other words, the number of HARQ channels K1, K2, K3 is selected such that at least the round-trip time TTI of one time channel K1, K2, K3 is covered by transmissions on the other time channels K1, K2, K3.

In the context of this method, "asynchronous" means that a re-transmission of a packet can be sent in any transmission time interval TTI with the start time $t \geq K+N_{RT}$, with k being the transmission time interval number of the first transmission and $N_{RT}$ the number of transmission time intervals within the round-trip time $T_{rt}$. Different control parameters are required to control this HARQ method and these have to be transmitted from the sender to the recipient. The recipient must, therefore, be notified by specific signaling of both the HARQ channel number KN and whether it is a new packet or a re-transmission of the last packet. The latter signaling takes place by means of the packet number PN.

Figure 2:
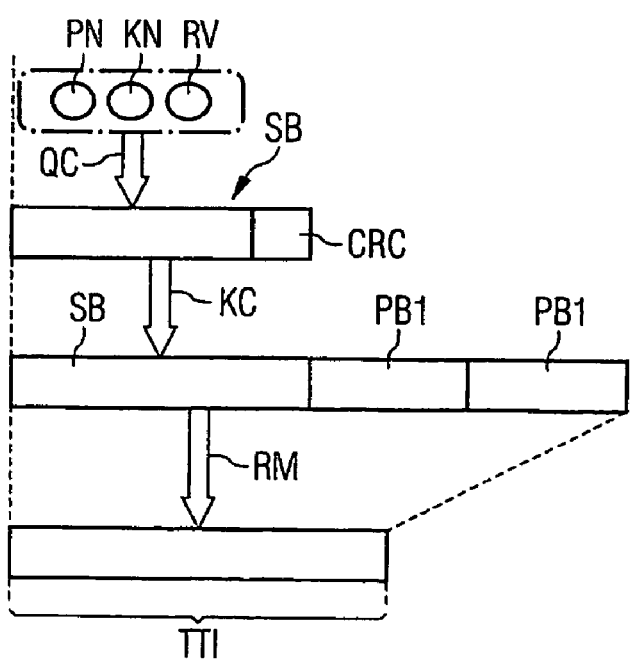
FIG. 2 illustrates a schematic diagram of the coding of control parameters for a transmission on the physical channel.
Figure 2A:
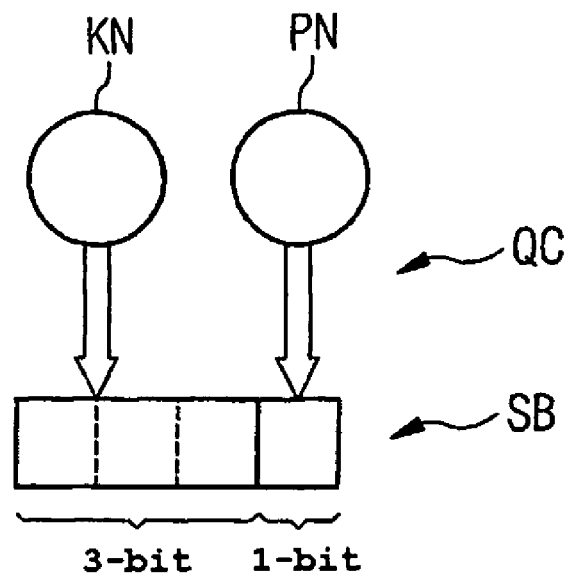
FIG. 2a illustrates a schematic diagram of the source-coding of a channel number of a time channel and a packet number according to the prior art.

FIG. 2 illustrates a schematic diagram of how the control parameters KN, PN are coded for the transmission. With the methods used to date, e.g., the HSDPA method in the UMTS standard as described above, a separate source-coding QC is first carried out of the HARQ channel number KN into three signaling bits SB and the packet number PN into a further one signaling bit SB. This is illustrated in more detail in FIG. 2a. The signaling bits SB are then appended to each other and CRC signaling bits are added. During source-coding so-called CRC (CRC=cyclic redundancy check) data is also added, which is used by the recipient during decoding to verify the correct transmission of the information. The entire bit sequence is then channel-coded KC, with redundant data, for example, such as parity bits PB1, PB2 being added to the systematic data, which resulted during source-coding. In a so-called rate matching method RM, this data is then reduced, such that it can be transmitted within a specified transmission time interval TTI of an HARQ channel.

As already described, in many situations it would be more favorable, in particular for example in the case of a data transmission in soft-handover mode (hereafter referred to as SHO mode) also using the soft-combining method described above, to use an n-bit packet number PN, where n>1, instead of a 1-bit packet number PN. In such an instance, there is only a risk of confusing a new packet and a re-transmission of the last packet, when the recipient in question has been unable to decode any of the transmissions of 2n−1 packets in sequence in the meantime.

Figure 2B:
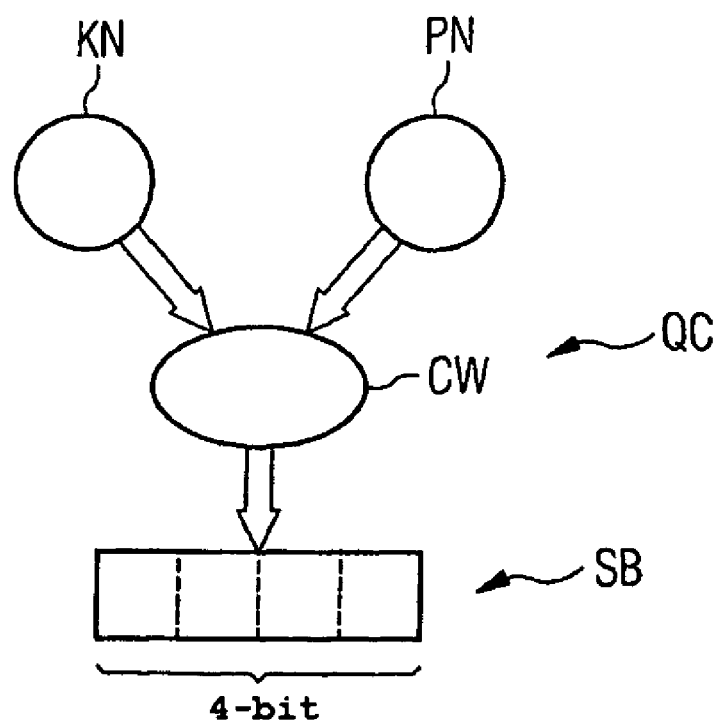
FIG. 2b illustrates a schematic diagram of the source-coding of a channel number of a time channel and a packet number according to an embodiment of the invention.

The present invention minimizes signaling outlay as far as possible despite an increase in the number of packet numbers that can be signaled. In other words, to save signaling bits SB, the packet number PN is source-coded together with other control parameters. In the case of the exemplary embodiment described below, common source-coding QC of the packet number PN takes place together with the HARQ channel number. For example, as illustrated in FIG. 2b, code word CW is thereby assigned to every combination of a specific packet number PN and a specific HARQ channel number KN, which is then converted by source-coding QC to the required number of signaling bits SB. It is, thus, possible to keep the data throughput as high as possible even in SHO mode, while still retaining the advantages of asynchronous HARQ and soft-combining.

The common source-coding of HARQ channel numbers and packet numbers allows the available code word space to be utilized more effectively. The table in FIG. 3 illustrates the number $M_s$ of packet numbers PN that can be signaled with separate source-coding (according to the prior art) for typical values of numbers N of channel numbers KN that can be signaled and typical numbers b of signaling bits SB. The number $M_s$ of packet numbers PN that can be signaled was calculated according to equation (1). The number $M_s$ of packet numbers PN that can be signaled is thereby the same for all HARQ channels. In comparison, the table in FIG. 4 illustrates the mean number $M_j$ of packet numbers PN that can be signaled calculated correspondingly according to equation (2) with common source-coding according to the present invention. The table in FIG. 5 illustrates the corresponding percentage gain due to common coding.

A total of 4 signaling bits SB are available on the HSDPA channel mentioned above for signaling the channel number KN and the packet number PN, with 3 bits being reserved for the channel number. As with n-bit coding precisely 2n channels can be signaled, it is possible to signal 8 channels with these 3 signaling bits. As on the other hand the round-trip time TRT is only 6 transmission time intervals TTI, 6 channels would suffice for a sender to be able to send at any time. The two additional possible channels are not needed per se. As shown in the table in FIG. 3, however, with a separate source-coding only two packet numbers can be signaled with a total of b=4 signaling bits, irrespective of whether 6 or 8 HARQ channels are signaled. In contrast, the table in FIG. 4 illustrates that with a common coding a mean total of 2.67 packet numbers can advantageously be signaled with 4 bits and 6 HARQ channels. In other words, 3 packet numbers can be signaled for ⅔ (i.e. 4) of the HARQ channels and 2 packet numbers can be signaled for ⅓ (i.e. 2) of the HARQ channels. This corresponds to a gain of 33%. This example illustrates very clearly how the number of HARQ channels can expediently be reduced to the minimum number predefined by the round-trip time TRT with the aid of the claimed method and the code space released as a result can be used for signaling the packet number.

If, however, the sender cannot transmit permanently due to limited resources, it can be expedient to reduce the number of HARQ channels to below the minimum number predefined by the round-trip time $T_{RT}$, thereby achieving even more signaling gain for the packet number, which further reduces the probability of error due to packet confusion.

As the example above shows, the claimed method makes it possible and often also expedient to use a different number of packet numbers PN that can be signaled quite specifically for different HARQ channels. In other words, the total number of code words can be allocated in a flexible manner to the individual HARQ channels. All the distributions $P=\{p_1, p_2, \ldots, p_N\}$ of the number of packet numbers $p_i$ that can be signaled as described above with reference to equation (3) are thereby always possible.

A further possibility for optimization results from the fact that the number of HARQ channels used and/or the distribution function P of the number of packet numbers that can be signaled changes over time. These parameters can, for example, very, depending on whether or not the terminal in question is in SHO mode or whether or not the IR method (method with incremental redundancy) described above is used. Other connection and network characteristics, such as cell utilization, can also be taken into consideration.

If network utilization is low, a relatively homogenous distribution is advantageous, for example, as a terminal wishing to transmit is then very likely to be able to transmit in a number of successive transmission time intervals TTI and all the HAR channels are therefore in use. If network utilization is high, a specific terminal will rarely be assigned resources in a continuous manner within the round-trip time $T_{RT}$, so that only a few HARQ channels are generally in use. It is then advantageous to assign a higher number of packet numbers that can be signaled to these HARQ channels, in particular in SHO mode. The channels with a higher number of packet numbers that can be signaled can thereby preferably be used, in particular in SHO mode, thus reducing the probability of error due to lost packets. Notification of current configurations can thereby also be sent (e.g., semi-statically) from the network to the terminals. In particular, the base station scheduler knows the distribution function P of the terminals and can take this into account when deciding on resource allocation.

Different exemplary embodiments of possible packet number distributions $P=\{p_1, p_2, \ldots, p_N\}$ in the different HARQ channels are described below with reference to the table in FIG. 6. The table illustrates a summary of different distributions P as a function of the number of information bits and HARQ channels. It should be noted that all permutations of a distribution P are in principle equivalent, as long as the selection algorithm of the HARQ channels is tailored to this. It should also be noted that the variants shown in FIG. 6 are only a selection of all possible variants.

A round-trip time of six transmission time intervals TTI is assumed in all the exemplary embodiments according to FIG. 6. It is also assumed that the only soft-combining method used is a chase-combining method, i.e., no incremental redundancy is used, or that the source-coding of the redundancy version is independent thereof. With common source-coding the number of HARQ channels N used can first be reduced from eight to six, without loss of performance, even with low network utilization. The code words can also be distributed in a flexible manner to these 6 channels.

The proposed distribution functions can thereby be classified in three groups:
Type 1: identical distribution functions. All the numbers of packet numbers pi in the different HARQ channels i are thereby identical.
Type 2: homogenous distribution functions. Subject to the basic condition of full code space utilization W=2b, the numbers of packet numbers pi are selected such that the difference between the maximum and minimum numbers of packet numbers pi is minimal in the different HARQ channels i, i.e., they differ by 1 maximum.
Type 3: inhomogenous distribution functions. These are all other distribution functions.

The different types are specified in the first column of the table.

In the exemplary embodiments in the first line of the table, a total of b=4 signaling bits are available for signaling the 6 HARQ channels and the packet numbers. These are typical values for transmission time intervals TTI of 2 ms, as used with HSDPA, and as may also be used in an improved, faster uplink channel, e.g., the EDCH (enhanced dedicated channel).

A number of variants are also possible:
1. Constantly Identical Source-Coding:
With this variant it is advantageous to use a distribution P of the number of packet numbers that can be signaled on the six HARQ channels, as optimized for the instances mainly occurring. As SHO mode only occurs around 30% of the time, it appears to be expedient not to use more than 4 information bits (as in HSDPA). However, to reduce the probability of error for some HARQ channels in SHO mode, a homogenous or inhomogenous distribution (types A2 and A3) should be used, e.g., {3, 3, 3, 3, 2, 2}, {4, 3, 3, 2, 2, 2}, {4, 4, 2, 2, 2, 2} or {5, 3, 2, 2, 2, 2}. The figures {$p_1, p_2, \ldots, p_N$} in the brackets hereby refer respectively to the number of packet numbers pi that can be signaled for the HARQ channel i. The precise choice of distribution is a function of the frequency of error as a function of the number of packet numbers that can be signaled and the assumed utilization of the system. The higher the mean assumed utilization of the system (i.e., the cells), the fewer HARQ channels have to have a high number of packet numbers that can be signaled.

Alternatively, 5 information bits (types B1, B2 and B3) can be used. There are then 32 signaling options and according to the considerations above it is advantageous to use the distributions {8, 8, 8, 3, 3, 2}, {8, 8, 8, 4, 2, 2}, {6, 6, 6, 6, 4, 4}, {7, 7, 7, 7, 2, 2}, {6, 6, 6, 5, 5, 5} for example. It should be noted that here 5 information bits suffice to establish a similar basic error protection in the majority of cases occurring as with 6 information bits with separate source-coding (namely 8 packet numbers that can be signaled). By saving information bits, it is now possible to use a lower code rate with the same number of coded bits and achieve a coding gain. This again increases the probability that the recipients will be able to decode the information correctly. If a code rate of 0.5 is assumed for 6 information bits, the code rate is 0.42 for 5 information bits and 0.33 for 4 information bits.

2. Different Source-Coding Depending on SHO Mode But Constant Number of Information Bits:
With this variant for example 4 information bits are always used. The distribution function varies depending on whether or not SHO mode is present. In the non-SHO instance as homogenous a distribution as possible, such as {3, 3, 3, 3, 2, 2} can be used. An identical distribution {2, 2, 2, 2, 2, 2} is also possible. This leaves unused code words, which can be used to make a code word selection that optimizes the channel coding performance.

In contrast in SHO mode an inhomogenous distribution can be used, such as {4, 3, 3, 2, 2, 2}, {4, 4, 2, 2, 2, 2} or {5, 3, 2, 2, 2, 2} or {6, 2, 2, 2, 2, 2}. To increase the number of packet numbers that can be signaled, it is also possible to reduce the number of HARQ channels. If for example only 5 channels are configured, options result such as {5, 4, 3, 2, 2}, {5, 5, 2, 2, 2}, {6, 4, 2, 2, 2}, {6, 3, 3, 2, 2}.

It should be noted that reducing the number of HARQ channels to below the minimum number required for the round-trip can mean that a specific terminal is unable to transmit at many times. Once there are a number of terminals in a cell, it is, however, unlikely that no single terminal would be able to transmit at a specific time. Also the base station scheduler can take this circumstance into account when allocating resources. The gain due to the reduction in the probability of error due to packet confusion can then more than compensate for the loss (of multi-user diversity) due to the reduction in the HARQ channels. A general advantage of this variant is that the constant number of information bits means that the same channel coding can always be used.

3. Different Source-Coding Depending on SHO Mode with a Variable Number of Information Bits:

This variant loses the advantage of variant 2 in favor of more flexible adaptation. For example, in the non-SHO instance 4 information bits can be used and a distribution can be employed as described in the table under type A1 or A2. In contrast in SHO mode 5 information bits can be used, as a result of which higher numbers of packet numbers that can be signaled can be achieved. Examples of these are found in the table under types B1, B2, B3. If, however, the same channel coding (as in variant 2) is used, this can be done by saving bits in other areas of the control information.

For example in SHO mode fewer parameters may suffice for signaling a redundancy version. A distinction between self-decodable and non-self-decodable packets (as proposed in the current HARQ method for HSDPA) may then be superfluous. This is because it can often happen in SHO mode that a base station does not receive the first packet. If the second packet sent is then a non-self-decodable packet, the base station will be unable to decode this packet alone. In this instance, the parameter for the so-called redundancy version can be omitted too and the redundancy version is then calculated by a predefined algorithm from the frame number or similar numbering. This is because it can often happen in SHO mode that a base station can only receive some of the packets, while the others are received by another base station instead. As the mobile station does not know precisely which base station receives which packets, it cannot optimize the sequence of the redundancy versions as well as the base station, for example, with a transmission on the HSDPA downlink channel. Alternatively, the parameter for the redundancy version can be reduced to fewer bits, e.g., just 1 bit in SHO mode but 3 bits without SHO. Redundancy version signaling is also not required if only chase-combining is used, as here all transmissions of a packet are implemented with identical bits.

4. Different Source-Coding by Means of Specific Signaling by the Network:

This variant offers even greater flexibility in that the network notifies the terminals dynamically of the HARQ configuration (i.e., the number of HARQ channels and the number of packet numbers that can be signaled for each channel) to be used. This can also be linked to an automatic modification of the HARQ configuration depending on the SHO mode. This has the advantage that no specific signaling is required.

The additional flexibility also allows the network to adapt the distribution function to network utilization.

The following distributions can be used here by way of an example:

non-SHO mode: {3, 3, 3, 3, 2, 2}
SHO mode, low network utilization: {4, 3, 3, 2, 2, 2}
SHO mode, mean network utilization: {5, 3, 2, 2, 2, 2}
SHO mode, high network utilization: {6, 4, 2, 2, 2}

Only 4 information bits are always used with this variant.

It is, however, also possible to increase the number of information bits in SHO, e.g.:

non-SHO mode: {3, 3, 3, 3, 2, 2}
SHO mode, low network utilization: {6, 6, 5, 5, 5, 5}
SHO mode, mean network utilization: {7, 7, 7, 7, 2, 2}
SHO mode, high network utilization: {8, 8, 8, 4, 2, 2}

Code space utilization efficiency can also be increased by including further control parameters that have to be sent with every packet in the common source-coding. These include the control parameters, for example, that describe the transport format used. If an IR method is used, the recipient also needs the redundancy version, which contains information about the coded bits in the respective transmission. With such a method, therefore, the packet number and optionally also the HARQ channel number are preferably source-coded together with the redundancy version. A different number of redundancy versions that can be signaled can thereby preferably be used for different HARQ channels. The distribution function Q of the number of redundancy versions $a_i$ that can be signaled for each HARQ channel i can also be adapted and optimized taking into account connection and network characteristics (SHO mode or non-SHO mode, cell utilization).

In non-SHO mode, the probability that a recipient can detect and superimpose a number of successive transmissions of a packet is very high. It, therefore, makes sense to use incremental redundancy in this mode, to achieve an additional decoding gain by lowering the code rate by re-transmitting packets. In SHO mode, however, this probability is lower, so the additional gain due to incremental redundancy is significantly reduced or can even become disadvantageous in the case of so-called "full IR", where not all transmissions can be decoded alone per se. It is, therefore, expedient in SHO mode just to use a chase-combining method or the so-called partial IR method, where all transmissions can be decoded alone per se (self-decodable). In this instance, a signaling whether or not the message is a self-decodable message is not necessary. If just a chase-combining method is used in SHO mode, these bits can be used for signaling packet numbers.

The table in FIG. 7 illustrates the distribution of signaling bits, when a total of b=6 signaling bits is used with a separate source-coding of the parameters according to the prior art. The associated number of options that can be signaled is shown in the table in FIG. 8. If the three parameters packet number PN, HARQ channel KN and redundancy version RV—are source-coded together according to the claimed method, the following further optimization is for example then possible:

In the non-SHO instance only 2 packet numbers are required, so the other signaling options can be distributed to the possible redundancy versions. In this instance, the mean number Lj, non-SHO of redundancy versions that can be signaled is obtained using the following equation:

$$L_{j,non-SHO} = \frac{2^b}{2N_{HARQ}} \quad (4)$$

If N=6 channels is assumed, as in the above exemplary embodiments, and a total of b=6 signaling bits is used, the mean number of redundancy versions that can be signaled rises to 5.33. If a chase-combining method is used in SHO mode, signaling of the redundancy version is not necessary. The mean number of packet numbers that can be signaled is therefore obtained using equation (2) as before. In the example mentioned, a mean number of 10.67 packet numbers that can be signaled is achieved.

The table in FIG. 9 summarizes these exemplary embodiments in the first two lines. The type of possible distribution functions according to the table in FIG. 6 is given in brackets in each instance. However, generally, a really large number of redundancy versions that can be signaled is not necessary. The required number of packet numbers PN that can be signaled can also be less than 8 in some instances, as can be determined by error probability simulations. It can, therefore, also be expedient to save a bit by such common source-coding. In other words, only using b=5 signaling bits instead of b=6 signaling bits. A mean number of 2.67 redundancy versions that can be signaled is then possible for each HARQ channel according to the above procedure in the non-SHO instance.

In SHO mode signaling of the redundancy version is again not necessary. This means that a mean number of 5.33 packet numbers that can be signaled is implemented with 5 bits. This particularly preferred embodiment is summarized again in the table in FIG. 10. The table in FIG. 11 shows the corresponding values for b=4. With common source-coding of the redundancy version as well the above statement applies by analogy that in non-SHO mode it is possible to assign a larger number of redundancy versions that can be signaled quite specifically to specific HARQ channels and these can then also be used in preference. All further statements relating to the distribution function P of the number of packet numbers that can be signaled therefore also apply by analogy for a distribution function Q of the number of redundancy versions that can be signaled.

As a further option this method can also be used in a scenario where incremental redundancy is also used in SHO mode. If the mean number of redundancy versions that can be signaled is Lj,SHO, the mean number of packet numbers that can be signaled in SHO Mj,SHO is calculated according to the equation:

$$M_{j,SHO} = \frac{2^b}{L_{j,SHO} \cdot H_{HARQ}} \quad (5)$$

The third line of the table in FIG. 9 shows such an example for b=6. It is also possible to modify the equation (5) for a specific required mean number Mj of packet numbers that can be signaled and required HARQ channels to determine the mean number of redundancy versions that can be signaled. The fourth line in the table in FIG. 9 shows this for b=6 and a mean number Mj=8 packet numbers that can be signaled.

With IR methods there is an additional optimization option of using a distribution function Q that changes over time for the number of redundancy versions that can be signaled $a_i$ for each HARQ channel i, with the object of optimizing the number of redundancy versions that can be used during packet transmissions. When using type I from the table in FIG. 6 (b=3) on average 1.33 redundancy versions can be signaled. This means that two redundancy versions can be signaled for two HARQ channels and just one redundancy version for the other four HARQ channels. This means that the performance for these four HARQ channels is not as good as for the first two. This fact can be taken into account when selecting the channels, in that the two HARQ channels, on which two redundancy versions can be signaled, are used in preference. However, with a full data throughput it is necessary to use all the HARQ channels. In order to achieve a good performance for all channels in this instance, the number of redundancy versions that can be signaled can preferably be assigned to the channels in a manner that changes over time. At one time then two redundancy versions could be signaled for the first two channels but at a later time they could be signaled for other channels.

FIG. 12 illustrates a possible use situation. The lines of the table represent arbitrary, preferably fixed time units. The time units are thereby selected such that they correspond to the round-trip time TRT for the HARQ process. During time unit 1 the higher number of redundancy versions (in this instance two redundancy versions) can be signaled for channels 1 and 2, during time unit 2 for channels 3 and 4 and during time unit 3 for channels 5 and 6. The preferred channels, therefore, change. At the end of time unit 3, the pattern can be repeated or a different pattern can be used, as illustrated in the table. These patterns can then be repeated or combined in any manner. Variable assignment over time allows the different channels to achieve the same performance. In particular, it means that more than just one redundancy version can be signaled for all channels.

The following principles apply when selecting redundancy versions:

A different redundancy version from the one used during the first transmission should be used for a re-transmission. Therefore if two redundancy versions can be signaled during the re-transmission, the one that was not used during the first transmission should be signaled. If two redundancy versions can be transmitted during the first transmission, the selection should be made in a forward-looking manner, such that a different redundancy version can be signaled for the re-transmission. If at the anticipated time of the (potentially necessary) re-transmission only one redundancy version can be signaled, a different redundancy version should be selected during a first transmission with a view to the future. If more than one HARQ channel can be selected at a certain time, said selection can also take into account whether a favorable redundancy version can be signaled on the channel.

If the data is transmitted at maximum utilization, all the HARQ channels are active. If 1.5 redundancy versions are available for each HARQ channel, it can be ensured with the forward-looking allocation described that different redundancy versions can always be signaled during re-transmissions. However, in the above example only 1.33 redundancy versions are available, but an optimum strategy can be designed for this too.

FIG. 13 illustrates the redundancy versions that can be signaled for each time unit. Only one HARQ channel is shown for clarity. With the described assignment a different redundancy version from the one signaled for the first packet can always be signaled for the re-transmitted packet, if both packets are sent at successive times. This is also true, if the re-transmitted packet is sent in the next but one time interval. Only if the packet is re-transmitted after three time intervals, is this not possible in ⅔ of cases. With such long time intervals however, there are generally a number of HARQ channels, so that a suitable channel can be selected as described above.

As already mentioned above, the channels can preferably be used with a higher number of packet numbers that can be signaled in particular in SHO mode—thereby reducing the probability of error due to lost packets. In order to achieve a correspondence between the distribution function P that is predefined or signaled by the network and the HARQ channels actually used by the terminal, the sequence must be specified, in which the HARQ channels are to be used. Such an algorithm must be prescribed for all senders. The selection algorithm should be tailored to the distribution function.

In a particularly simple instance the distribution function P is a monotonously decreasing (or increasing) function in respect of the HARQ channel number, i.e. $p_i \leq p_j$ (or $p_i \geq p_j$) for all i>j. This allows the use of a very fast, uncomplicated selection algorithm, with which the smallest possible (or largest possible) free channel number is simply used in each instance. This ensures that the channels with a higher number of packets numbers that can be signaled are actually used in preference. This algorithm is based on the concept that on average the HARQ channel with the highest number of packet numbers that can be signaled will also have the highest number of completed transmissions until the same packet number is re-used. On average this also reduces the probability of incorrect superimposition of two transmissions.

A further, higher-performance algorithm involves maximizing the time period between the repetition of a specific combination of HARQ channel number and packet number. This can be achieved by storing the time of last use for every HARQ channel/packet number combination and always selecting the free combination with the oldest entry. If a number of entries are of the same age, further criteria can optionally be used. In this instance it may for example be expedient to prefer a combination with a slightly more recent date, if it has a higher number of packet numbers that can be signaled. The reason for this is that the pattern of achievable time intervals may be more favorable in the future.

Alternatively the number of transmissions last carried out can also be stored for every HARQ channel/packet number combination. For every packet to be transmitted for the first time, the free HARQ channel for which the maximum number of transmissions has been carried out since the last use of the current packet number is selected. See FIG. 14 further illustrates the details of this selection method. It is thereby assumed that 6 channels are currently free. The number of packets numbers that can be signaled in the different channels is P={4, 3, 3, 2, 2, 2}, as shown in the 2nd column of the table. The corresponding fields are marked with a dash for channels that can signal fewer than 4 packet numbers. The generally available packet numbers are constantly used in a cyclically alternating manner for each HARQ channel i. For example the current packet number $_{pa,i}$—i.e., the packet number to be used for the next first transmission—can be calculated by increasing the last used packet number of this HARQ channel and the modulo operation:

$$p_{a,i} = (p_{a-1,i}+1) \bmod p_i \qquad (6)$$

In the example illustrated in FIG. 14, the values according to column 3 of the table, which are shaded in the table, are used as the current packet numbers. The number of transmissions since the last use of the current packet number to be used in each instance can be calculated for each of the HARQ channels by adding together all the transmissions n(p) with packet numbers that are not the same as the current one:

$$N_i = \sum_{\substack{k=1 \\ k \neq n_i}}^{p_i} n_{k,i} \qquad (7)$$

The free channel having the maximum Ni can be selected. In the example described above, this is the HARQ channel 3.

This example illustrates that the free HARQ channel with the highest number of packet numbers that can be signaled does not necessarily always have to be preferred. The second algorithm shown is, therefore, more complex but is higher-performance than the first, simple algorithm. The second algorithm ensures that the HARQ channel, in which the highest possible number of transmissions have been carried out since the last use of the current packet number, is used. Packets can, therefore, only be confused, if a recipient has been unable to decode precisely this number of transmissions of the control information to this HARQ channel. One disadvantage is that the number of transmissions $n_{k,i}$ must be stored for every HARQ channel/packet number combination.

It is possible to reduce the storage requirement of the second algorithm, if only the mean number of transmissions for each packet number $\overline{n}_i$ is stored for each HARQ channel. The number $N_i$ of transmissions since the last use is then calculated as follows:

$$N_i = (p_i - 1) \cdot \overline{n}_i \qquad (8)$$

with $$\overline{n}_i = \frac{1}{l} \sum_{k=1}^{l} n_{k,i} \qquad (9)$$

with the last $1 \leq p_i$ values being used for averaging in each instance. The storage requirement is then a function of the number of support points l that are used for averaging and is N.l where N is the number of HARQ channels again. If only one value is used for each HARQ channel (l=1) in the above example the storage outlay drops from 16 values to 6 values, even to 12 values for l=2. The reliability of the mean value increases as the number of support points l increases. For l=pi this simplified algorithm is identical to the one described above.

The algorithm is further improved if in addition to the number of transmissions for each HARQ channel, the time that has elapsed is also taken into account. If this time is very short and for example within the so-called coherence time of the mobile radio channel, within which the channel characteristics are approximately constant, it is possible that it will not be possible for even a large number of transmissions to be decoded by a specific recipient. This is the case for example when said radio transmission takes place in a fade situation, in which the receive level is very low and/or if the sender is already transmitting at the maximum possible transmit power. The probability that all the interim transmissions on an HARQ channel will be lost therefore decreases as the elapsed time increases (so-called temporal diversity).

With an improved algorithm therefore an associated time information element is stored in addition to the number of transmissions of each HARQ channel/packet number combination, for example the time of the last transmission of an HARQ channel/packet number combination or the mean time period between two successive packet numbers for every HARQ channel. The method operates in the same way as the algorithms outlined above but with the parameter "time of last transmission" stored instead of the parameter "number of transmissions" or the "mean time period between two successive packet numbers" instead of the "mean number of transmissions for each packet number". The HARQ channel for the next pending packet is then selected taking into account both the criteria of number of transmissions since the last use and the time that has thereby elapsed. This can be done for example by means of a weighted summation of the two criteria or a multiplication.

In principle it is also possible for the selection algorithm for the HARQ channel also to be based solely on the criterion "time period of the last transmission of an HARQ channel/ packet number combination". A further algorithm based on the mean use time of each HARQ channel is described below:

At the start the use times for all channels are initiated at an initial value, with the initial value also being able to be different for different HARQ channels. In particular the initial value for the HARQ channels having a large number of packet numbers can be selected greater than for the HARQ channels with a smaller number of packet numbers. Whenever a new packet is sent, the following steps are carried out:

The use times for all HARQ channels are increased by a uniform value irrespective of the number of channel numbers of the channels. However the use time for those channels that already have a very high use time can be increased less or the use time is limited to a maximum value. This maximum value can also be different for different HARQ channels. In particular the maximum value for HARQ channels having a large number of packet numbers can be selected greater than for channels with a smaller number of packet numbers.

The channel with the longest use time is then selected and the next packet is sent via this channel. However only the channels which are free to send a new packet are considered, in other words those where the sender is not still awaiting an outstanding confirmation. The use time for the selected channel is then reduced, with this reduction being able to be different for different HARQ channels. In particular the reduction for HARQ channels again having a large number of packet numbers can be selected smaller than for HARQ channels with a smaller number of packet numbers.

Instead of a maximum value limit, it can also be specified that if the maximum value is exceeded, the use time is reduced by an amount that is proportional to the amount by which the maximum value is exceeded. In the simplest instance this can be implemented, when the proportionality factor is a power of two, e.g. ¼. The examples show how the claimed method can be used to minimize the probability of error due to misinterpretation of packet numbers due to lost packets without additional signaling outlay. Only one common source-coding specification is thereby required for every combination used of numbers of HARQ channels used and/or distribution functions P of the number of packet numbers that can be signaled and/or distribution functions Q of the number of redundancy versions that can be signaled and this is known to both sender and recipient.

Finally it should be noted that the transmission methods shown specifically in the figures and described above are only exemplary embodiments, which can be modified by the person skilled in the art, without departing from the scope of the invention. Therefore, only the redundancy version and optionally also further other control parameters could be source-coded together with the packet number, for example when it is not necessary to transmit the number of the HARQ channel when using a partially synchronous HARQ method.

While the invention has been described with reference to one or more exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

LIST OF REFERENCE CHARACTERS

| | |
|---|---|
| B | Number of signaling bits |
| N | Number of channel numbers |
| Ms | Number of packet numbers |
| Mj | Mean number of packet numbers |
| QC | Source-coding |
| KC | Channel coding |
| RM | Rate-matching method |
| CW | Code word |
| PN | Packet number |
| KN | Time channel number |
| RV | Redundancy version indicator |
| K1 | Time channel |
| K2 | Time channel |
| K3 | Time channel |
| PK | Physical channel |
| PK' | Physical channel |
| SB | Signaling bit |
| CRC | CRC check bit |
| PB1 | Parity bit |
| PB2 | Parity bit |
| TTI | Transmission time interval |
| ACK | Positive confirmation signal |
| NACK | Negative confirmation signal |
| TRT | Round-trip time |
| TACK | Signal length |
| TNBP | Processing time |
| TUEP | Processing time |
| Tprop | Transmission time |
| T'prop | Transmission time |

The invention claimed is:

1. A method for transmitting control parameters on a physical channel between a mobile radio device and a base station in a cellular network, comprising:

providing with the control parameters a packet number for identifying a data packet;

source coding, via a source coding device, the packet number together with at least one further of the control parameters for the transmission, wherein the control parameters are used for controlling a packet-oriented data transmission between the mobile radio device and the base station;

transmitting, via a transmission device, the at least one further of the control parameters and the packet number between the mobile radio device and the base station;

implementing by a temporal distribution of the same physical channel, a plurality of different time channels available for sending data packets;

re-transmitting a data packet on one of the plurality of different time channels using the transmitting device in each instance, until the transmitting device receives a confirmation signal from a receiving device; and using at most so many different ones of the plurality of different time channels such that a sum of transmission time intervals of the different ones of the plurality of different time channels covers a round-trip time span at the end of which a re-transmission after a previous transmission can take place at the earliest on a specific one of the plurality of different time channels.

2. The method according to claim 1, further comprising including with the at least one further of the control parameters a channel number of the one of the plurality of different time channels, in which the data packet in question is sent.

3. The method according to claim 1, wherein a number of re-transmissions of the data packet are superimposed to decode the data packet.

4. The method according to claim 3, wherein an incremental redundancy method is used during the data packet transmission and the at least one further of the control parameters includes a redundancy version indicator.

5. The method according to claim 1, wherein the data packet transmission takes place by means of a multi-channel HARQ transmission method and the at least one further of the control parameters includes an HARQ parameter.

6. The method according to claim 1, wherein different numbers of packet numbers are assigned to different time channels, which are available for identifying the data packet on the time channel in question.

7. A method for transmitting control parameters on a physical channel between a mobile radio device and a base station in a cellular network, comprising:
   providing with the control parameters a packet number for identifying a data packet;
   source coding, via a source coding device, the packet number together with at least one further of the control parameters for the transmission, wherein the control parameters are used for controlling a packet-oriented data transmission between the mobile radio device and the base station;
   transmitting, via a transmission device, the at least one further of the control parameters and the packet number between the mobile radio device and the base station;
   implementing by a temporal distribution of the same physical channel, a plurality of different time channels available for sending data packets; and
   re-transmitting a data packet on one of the plurality of different time channels using the transmitting device in each instance, until the transmitting device receives a confirmation signal from a receiving device;
   wherein a number of re-transmissions of the data packet are superimposed to decode the data packet;
   wherein an incremental redundancy method is used during the data packet transmission and the at least one further of the control parameters includes a redundancy version indicator;
   wherein different numbers of redundancy version indicators are assigned to different time channels of the plurality of different time channels, which are available for signaling the redundancy version of the data packet transmission on said one of the plurality of different time channel.

8. The method according to claim 7, wherein at least one of a number of packet numbers and a number of redundancy version indicators of at least one of the plurality of different time channels are varied.

9. The method according to claim 8, wherein the number of redundancy version indicators of the time channel in question is modified according to a predefined sequence at specific time intervals.

10. The method according to claim 7, wherein at least one of a number of packet numbers and a number of redundancy version indicators of at least one of the plurality of different time channels are selected in each instance as a function of the current transmission situation.

11. The method according to claim 7, wherein transmission resources are allocated to a specific transmitting device taking into account at least one of a number of said different time channels used by the device in question, a number of packet numbers, and a number of the redundancy version indicators of the different time channels of the specific transmitting device in question.

12. A method for transmitting control parameters on a physical channel between a mobile radio device and a base station in a cellular network, comprising:
   providing with the control parameters a packet number for identifying a data packet;
   source coding, via a source coding device, the packet number together with at least one further of the control parameters for the transmission, wherein the control parameters are used for controlling a packet-oriented data transmission between the mobile radio device and the base station;
   transmitting, via a transmission device, the at least one further of the control parameters and the packet number between the mobile radio device and the base station;
   implementing by a temporal distribution of the same physical channel, a plurality of different time channels available for sending data packets; and
   re-transmitting a data packet on one of the plurality of different time channels using the transmitting device in each instance, until the transmitting device receives a confirmation signal from a receiving device;
   wherein different numbers of packet numbers are assigned to said different time channels, which are available for identifying the data packet on the time channel in question;
   wherein during selection of the one of the plurality of different time channels for a pending transmission of the data packet, the plurality of different time channels are prioritized according to their numbers of packet numbers.

13. The method according to claim 12, wherein a packet number distribution function, which defines a number of packet numbers assigned to individual time channels in the plurality of different time channels, is a monotonously increasing or monotonously decreasing function with respect to channel numbers of available time channels.

14. The method according to claim 12, wherein one of the plurality of time channels is selected for the pending transmission of the data packet according to a specific selection rule, taking into account when different combinations of channel numbers and packet numbers were last used.

15. The method according to claim 12, wherein a time channel is selected for the pending transmission of the data packet taking into account temporal information relating to transmissions to date on the different time channels of the plurality of different time channels.

16. The method according to claim 15, wherein one of the plurality of different time channels is selected for the pending transmission of the data packet taking into account use times to date of the different time channels of the plurality of different time channels.

* * * * *